United States Patent
Price et al.

(10) Patent No.: US 11,363,188 B2
(45) Date of Patent: Jun. 14, 2022

(54) MOTION-BASED OPERATION OF IMAGING DEVICES

(71) Applicant: Microsoft Technology Licensing, LLC, Redmond, WA (US)

(72) Inventors: Raymond Kirk Price, Redmond, WA (US); Christopher Douglas Edmonds, Carnation, WA (US); Michael Bleyer, Seattle, WA (US); Donald John Patrick O'Neil, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/904,120

(22) Filed: Jun. 17, 2020

(65) Prior Publication Data
US 2021/0400185 A1 Dec. 23, 2021

(51) Int. Cl.
H04N 5/232 (2006.01)
H04N 5/225 (2006.01)
H04N 5/235 (2006.01)

(52) U.S. Cl.
CPC ....... *H04N 5/23216* (2013.01); *H04N 5/2257* (2013.01); *H04N 5/2351* (2013.01); *H04N 5/2352* (2013.01); *H04N 5/23254* (2013.01)

(58) Field of Classification Search
CPC ............. H04N 5/23216; H04N 5/2257; H04N 5/2351; H04N 5/23254
See application file for complete search history.

(56) References Cited

U.S. PATENT DOCUMENTS

| 10,645,294 B1 | 5/2020 | Manzari et al. | |
|---|---|---|---|
| 2006/0291841 A1* | 12/2006 | Fukumoto | H04N 5/23264 396/55 |
| 2014/0263964 A1* | 9/2014 | Yang | H04N 5/347 250/208.1 |
| 2015/0049168 A1* | 2/2015 | Dielacher | H04N 7/18 348/46 |

(Continued)

FOREIGN PATENT DOCUMENTS

WO 2016148920 A1 9/2016

OTHER PUBLICATIONS

"International Search Report and Written Opinion Issued in PCT Application No. PCT/US2021/023709", dated Jun. 4, 2021, 28 Pages.

*Primary Examiner* — Jason A Flohre
(74) *Attorney, Agent, or Firm* — Alleman Hall Creasman & Tuttle LLP

(57) ABSTRACT

One aspect of this disclosure includes a method for operating a head-mounted display system that includes an imaging device. The method includes receiving an indication that an ambient light condition in an environment is below a lighting threshold. Responsive to the low lighting condition, an amount of motion of the head-mounted display relative to the environment is determined based on one or more signals received from an inertial measurement unit included in the head-mounted display system. An exposure time, frame rate, and a pixel-binning mode are automatically selected for the imaging device based on the determined amount of motion. Imagery is captured from the environment using the automatically selected exposure time, frame rate, and pixel-binning mode for the imaging device. The captured imagery is then displayed at the head-mounted display system.

16 Claims, 7 Drawing Sheets

(56) References Cited

U.S. PATENT DOCUMENTS

| | | | |
|---|---|---|---|
| 2016/0094770 A1* | 3/2016 | Chen | H04N 5/2353 |
| | | | 348/229.1 |
| 2018/0054559 A1* | 2/2018 | Welker | H04N 5/23222 |
| 2018/0367752 A1 | 12/2018 | Donsbach et al. | |
| 2019/0273114 A1* | 9/2019 | Liu | H04N 5/3559 |
| 2019/0295279 A1* | 9/2019 | Wang | G01B 11/2513 |
| 2020/0059612 A1* | 2/2020 | Kim | H04N 5/351 |
| 2020/0214539 A1* | 7/2020 | Takahashi | A61B 1/00006 |
| 2020/0358963 A1* | 11/2020 | Manzari | H04N 5/23245 |
| 2021/0201580 A1* | 7/2021 | Sztuk | G02B 27/0172 |
| 2021/0358187 A1* | 11/2021 | Kuang | G06T 11/60 |

* cited by examiner

MOTION-BASED OPERATION OF IMAGING DEVICES

BACKGROUND

Virtual reality and augmented reality devices offer users the opportunity to view imagery based on their surroundings in real-time. Captured images and/or images presented based on the user's surrounding environment must be processed rapidly and with high fidelity to provide a realistic user experience. Latency, noise, and motion blur may impact the presented imagery and disrupt the user's orientation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One aspect of this disclosure includes a method for operating a head-mounted display system that includes an imaging device. The method includes receiving an indication that an ambient light condition in an environment is below a lighting threshold. Responsive to the low lighting condition, an amount of motion of the head-mounted display relative to the environment is determined based on one or more signals received from an inertial measurement unit included in the head-mounted display system. An exposure time, frame rate, and a pixel-binning mode are automatically selected for the imaging device based on the determined amount of motion. Imagery is captured from the environment using the automatically selected exposure time, frame rate, and pixel-binning mode for the imaging device. The captured imagery is then displayed at the head-mounted display system.

DETAILED DESCRIPTION

Externally facing cameras have been used in a variety of sensing applications for virtual reality (VR) and augmented reality (AR) devices. The associated imaging sensors have the ability to capture scene information, which may then be processed and provided back to the user on a display screen. For VII devices, external cameras may provide a video passthrough mode that enables the user to see and interact with the world around them as if the user were viewing their environment directly. For AR devices, imaging sensors may provide the user with improved night vision using low light cameras or with the ability to see the temperature of the scene around them via thermal imaging sensors. These imaging capabilities are particularly useful to first responders and others operating in a variety of different, low-light environments.

Figure 1:
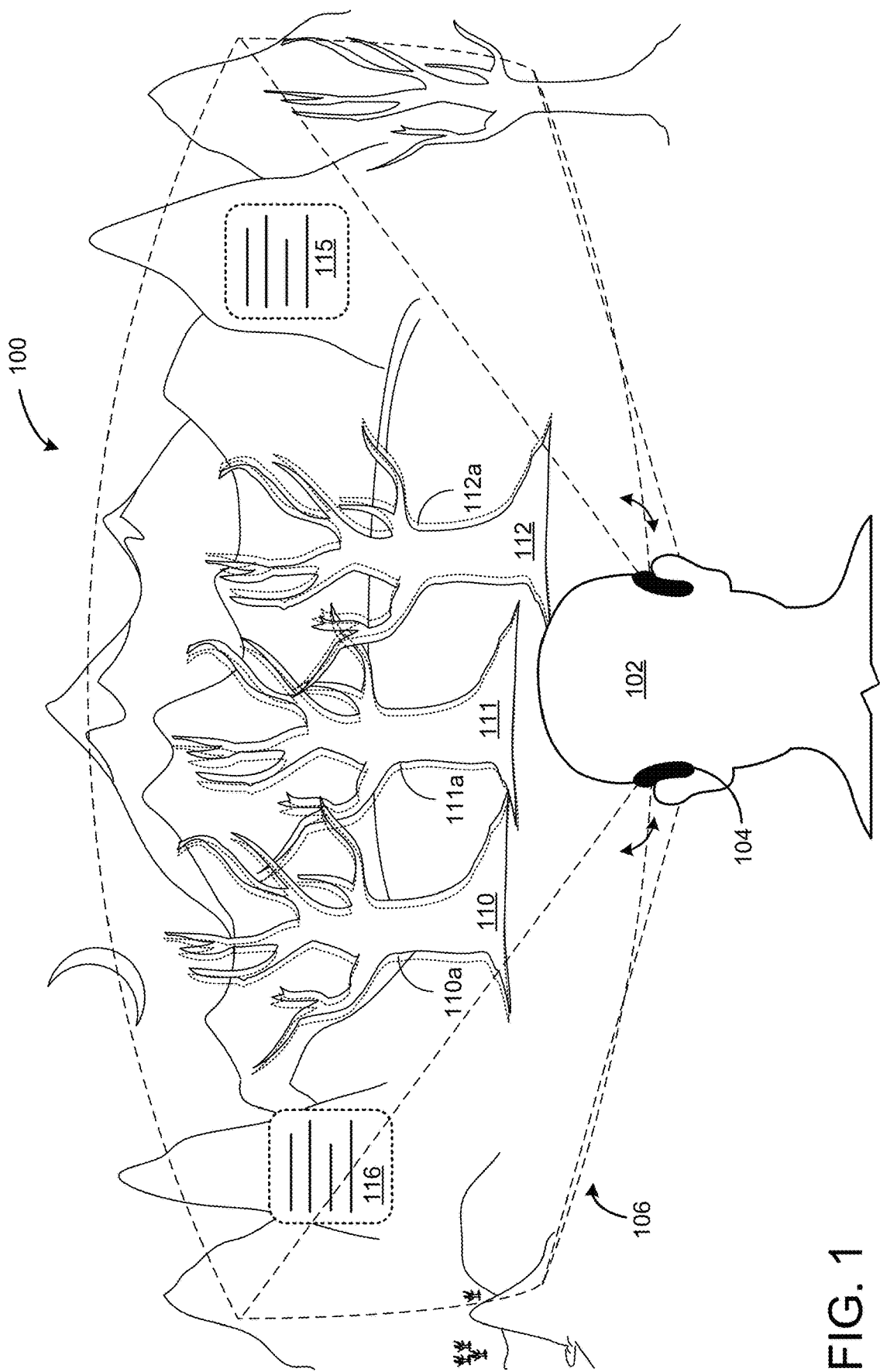
FIG. 1 shows an example wearable computing system within an environment.

As an example, FIG. 1 depicts an environment 100, wherein a user 102 is viewing the environment through computing system 104, which includes a head-mounted display (HMD). Computing system 104 includes an imaging device and a near-eye display. Other features of an example head-mounted display are discussed herein and with regard to FIG. 2. User 102 and/or computing system 104 may move relative to the environment (as indicated by arrows). Movement relative to the environment may include 6DoF movement of computing system 104 relative to a fixed point in the environment, (e.g., rotation of computing system 104), movement of objects in the environment relative to computing system 104, etc.

User 102 views a portion of environment 100 via computing system 104, yielding a field of view (FOV) 106 that may be augmented via the near-eye display. For example, image data of environment 100 taken by the imaging device may be displayed on the near-eye display. As such, user 102 may view real-world objects, such as trees 110, 111, and 112 (solid lines) and/or their video representations 110a, 111a, and 112a (dotted lines). Additional virtual objects 115 and 116 may also be displayed based on the acquired image data of environment 100.

In some examples, such as when computing system 104 is configured to include a see-through display, both real-world objects and their video representations may be viewed simultaneously. If the real-world objects and their video representations are precisely overlaid, user 102 may be able to experience an enhanced version of environment 100. For example, user 102 may be able to make out object outlines in low light, be able to view both an object and its thermal profile, etc. However, capturing and displaying objects on a head-mounted display in a low-light environment, such as environment 100 presents additional challenges. The computing device must operate in such a way that sufficient image data is obtained without adding significant noise or blurring.

Standard photodetector-based focal plane arrays are somewhat limited in that when ambient lighting level is reduced, the sensor image is dominated by dark current (e.g., current from reverse-biased photodetectors) and read noise (e.g., the noise from the readout circuitry). Typical digital cameras employ auto-exposure and auto-gain algorithms to capture and process images based on environmental lighting conditions, resulting in an increased signal-to-noise ratio in the captured images. However, in low-light imagery situations, exposure is likely to already be maximized. Increasing gain thus functions merely to increase noise.

Generally, there are two basic methods for reducing noise in these low light situations. One is to use hardware binning by combining the outputs of multiple pixels into a single analog readout (e.g., analog binning). The downside of binning is a reduction in the resolution of the captured imagery. Another approach is to increase the integration time, generally performed by decreasing the frame rate of the imaging device. With an increased integration time the amount of received signal is increased while maintaining the same noise characteristics. However, this may result in additional image blur to the system. Additionally or alternatively, images may be post-processed using multi-frame temporal averaging and appropriate motion compensation. In this way, image noise may be reduced by the square root of the number of averaged frames. However, this approach may also increase latency and reduce the effective frame rate, both of which may be undesirable in high-motion applications.

Herein, systems and methods are presented for automatically selecting the mode of operation for an imaging device of a head-mounted display system. During low-light conditions, frame rate and binning modes for the imaging device may be determined based on an amount of motion of the head-mounted display system. For example, an on-board Inertial Measurement Unit may be used to determine motion of the device. During low signal, high motion conditions, pixel binning may be implemented. During low signal, low motion conditions, frame rates may be reduced. During high motion conditions where signal-to-noise ratio remains below an acceptable threshold, frame rates may be reduced in addition to pixel binning. Multiple frame averaging, spatial filtering, & image signal processing (ISP) may also be implemented based on IMU signals.

Figure 2:
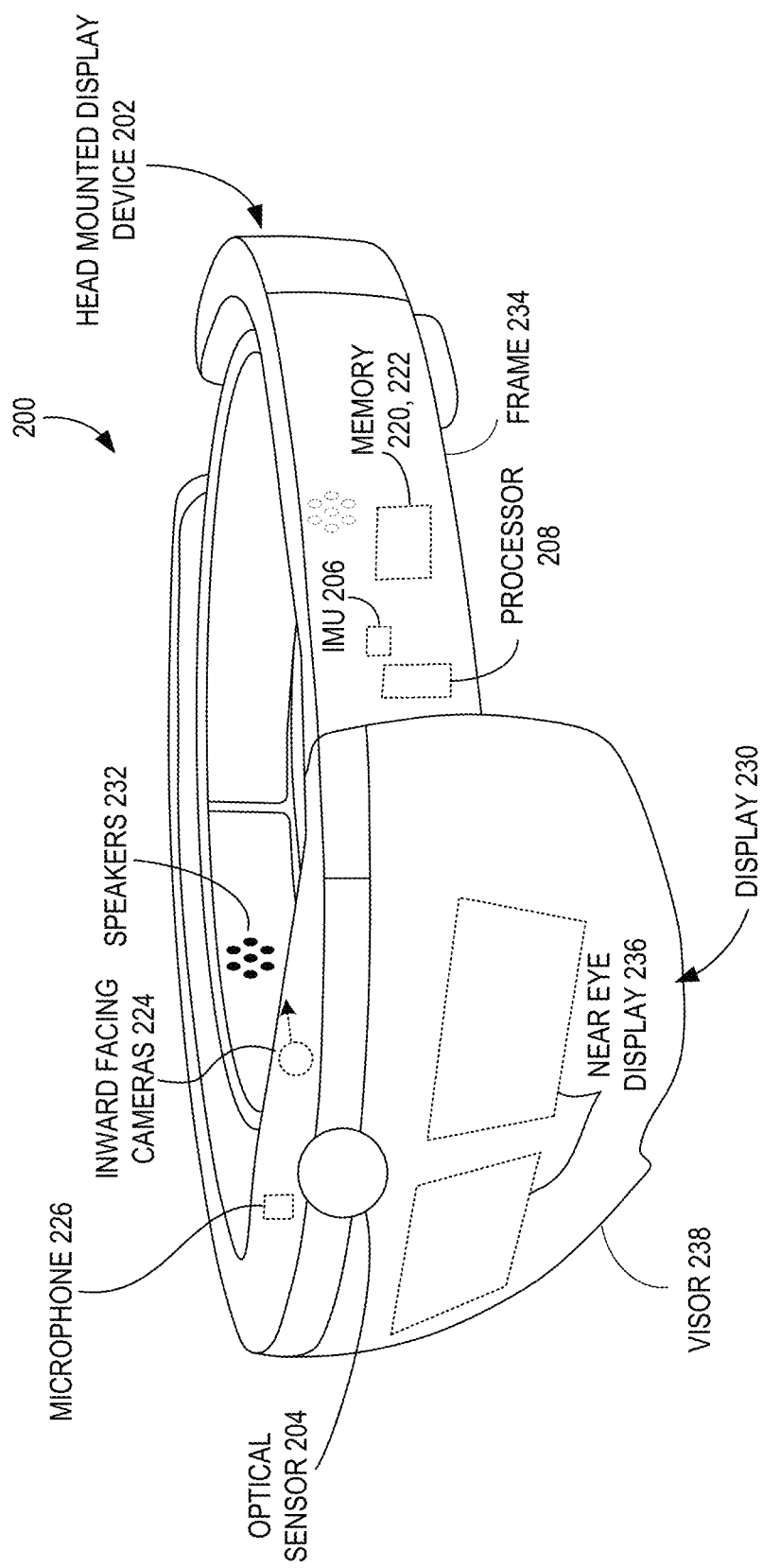
FIG. 2 is an example implementation of the computing system of FIG. 1.

FIG. 2 is an example implementation of the computing system 104 according to an example implementation of the present disclosure. In this example, as in FIG. 1, the computing system 200 is integrated into and/or implemented as an HMD device 202. In one example implementation, the computing system 200 may include one or more optical sensors, such as the depicted optical sensor 204 which may be a camera positioned centrally on an upper portion of HMD device 202 as shown in FIG. 2. Optical sensor 204 may be an RGB camera and/or low-light camera such as an IR camera configured for night vision. In some examples, optical sensor 204 may include a thermal camera, such as those configured to receive and detect IR light in a range of 8000 nm to 15,000 nm. It will be appreciated however that cameras included in the computing system 200 may be sensitive to various ranges of electromagnetic radiation as preferred by designers of the computing system 104, such as UV light, visible light, near infrared light, or other suitable frequencies. Optical sensor 204 may additionally or alternatively include a dedicated ambient light sensor, such as a digital light sensor, configured to indicate a total amount of visible light present within an environment.

Optical sensor 204 may include a sensor array of individually addressable pixels. In some implementations, the pixels may be complementary metal-oxide semiconductor (CMOS) elements, but other suitable architectures are envisaged as well. For example, pixels may include light sensing elements having compositions such as SiGe, InGaAs, InGaN, GaAsPh, and/or other III-V compounds. In some examples, the shuttered optical sensors may include PIN diodes made from alloy semiconductors such as InGaAs. As non-limiting examples, optical sensor 204 may include one or more of an array of silicon sensors having >5×5 um pixels, SiGe detectors having an extended detection range of up to 1.3 um, InGaAs focal plane arrays (FPA) exhibiting longer wavelength detection, and/or cooled detectors for infrared (e.g. short-wave infrared, medium infrared, long-wave infrared) detection. Each pixel is responsive to light over a broad wavelength band. For silicon-based (e.g. CMOS) pixels, the wavelength response may range from 300 to 1100 nm, for example.

In some examples, an optical shutter arranged over sensor array 104, so as to optically cover the sensor array. Such an optical shutter may be configured as a rolling shutter, wherein readouts of different portions of the image frames are performed at different times, such as on a sequential, line-by-line basis. Additionally or alternatively such an optical shutter may be configured as a global shutter, wherein accumulated charge is stored in a light-shielded region on a per-pixel or per-group-of pixels basis.

In some implementations, the pixels of the sensor array may be differential pixels. Each differential pixel may include different collection terminals that are energized according to two different clock signals. In one example, to measure modulated active illumination, the two clock signals may be substantially complementary (e.g., the two clock signals have 50% duty cycles that are 180 degrees out of phase). In other examples, the two different clock signals may have a different relationship, such as for measuring ambient illumination or non-modulated active illumination. While differential pixels provide the advantages described herein, it will be appreciated that other types of sensor array, including non-differential sensor arrays, may be used.

In some examples, a depth detection system (not shown) may also be included in the computing system 200 and integrated into the HMD device 202. The depth detection system may also include components such as a pair of stereo cameras and/or a pair of stereo low-level light cameras. Other depth detection systems may include a single camera and a light projector, a pair of cameras and a light projector, and/or a laser light source and a camera. However, active stereo methods of depth detection may additionally process light projected by a projector that may be received at right and left cameras. A structured light method of depth detection may also be integrated into the computing system 200, in which case a projector and one camera to receive reflected projected light may be utilized. If a time-of-flight method of depth detection is preferred, the HMD device 202 may include a laser light source and corresponding sensor such as an IR laser in addition to a camera to receive reflected laser light. In another configuration, an inertial measurement unit (IMU) 206 and a single camera may be used to detect depth.

The example computing system 200 includes a processor 208 and associated storage, which in FIG. 2 includes volatile memory 220 and non-volatile memory 222. The processor 208 is configured to execute instructions stored in the storage, using volatile memory 220 while executing instructions belonging to various programs and non-volatile memory 222 for storage of the programs. Other sensors that may be included in the computing system 200 as embodied in the HMD device 202 may be inward-facing cameras 224 to identify the position and orientation of each of a user's eyes and subsequently generate eye-tracking data. Also, a microphone 226 may receive natural language (NL) input from a user of the HMD device 202.

IMU 206 may be implemented in the HMD device 202 as described above, which may include accelerometers, gyroscopes, and/or a compass that can be used to detect, for example, a 3 degree of freedom (3DOF, e.g., orientation) of the HMD device. A 6 degree of freedom (6DOF) position and orientation of the HMD device 202, may also be detected. Processor 208 may further refine the 6DOF output of IMU 206 using visual tracking systems that search for movement of identified visual features in a series of images captured by optical sensor 204 and/or other cameras to generate an estimate of the relative movement of the HMD device 202 based upon the movement of these visual features within successive image frames captured by optical sensor 204 over time. It will be appreciated that components such as the microphone 226 and/or one or more optical sensors 204 may be integrated with the HMD device 202 or provided separately therefrom. It will be further appreciated that other types of sensors not displayed in FIG. 2 may be included in the computing system 200.

Figure 7:
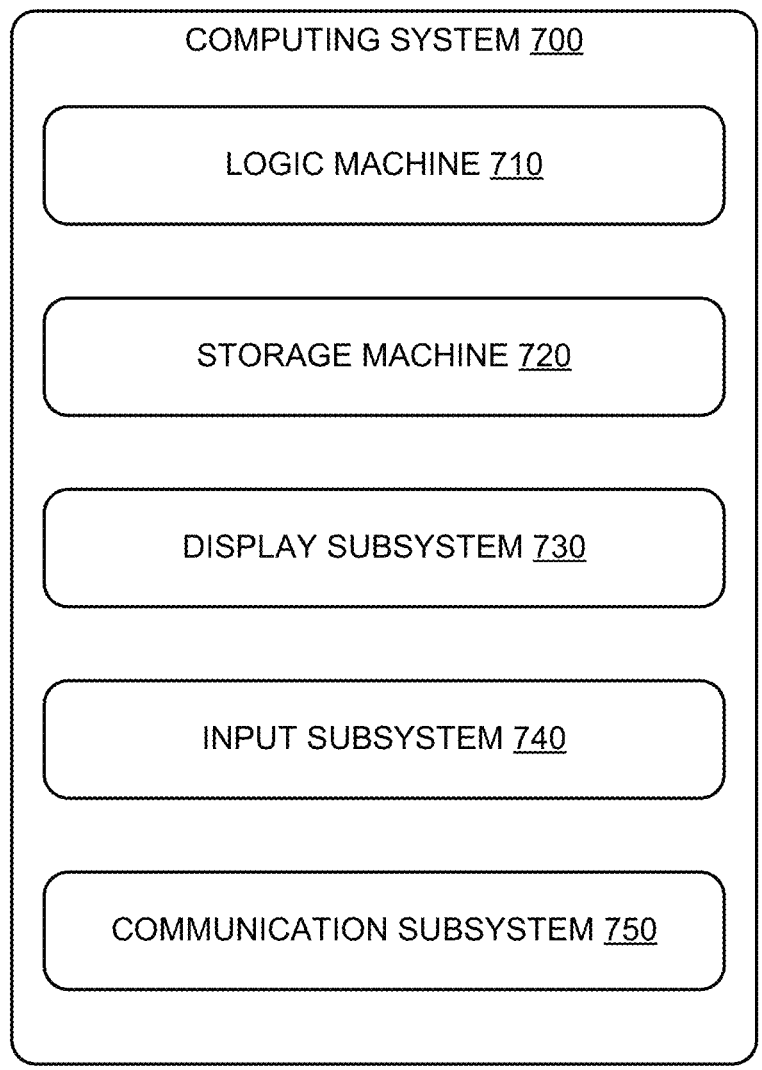
FIG. 7 is an example computing environment, which may be used to implement the computing system of FIG. 1.

A display 230 may be integrated with the HMD device 202, or optionally provided separately. Speakers 232 may also be included in the HMD device 202, or also provided separately. It will be appreciated that electronic and computing components may be connected via a bus. Furthermore, FIG. 7 depicts various computing system components that may correspond to the components of FIG. 2, and the descriptions of those components in FIG. 7 may therefore apply to such corresponding components in FIG. 2.

As shown in FIG. 2, the processor 208, volatile and non-volatile memories 220, 222, inward-facing cameras 224, optical sensor 204, microphone 262, IMU 206, and speakers 232 may be incorporated within a housing of HMD device 202 as shown. HMD device 202 may include a mounting frame 234 that at least partially encircles the head of a user, and the display 230 may include a pair of right and left near-eye displays 236A and 236B. The near-eye displays 236A and 236B may be positioned behind a visor 238 through which a user may observe the physical surroundings in an augmented reality (AR) system. It will be appreciated that the near eye displays 236A and 236B and visor 238 may be at least partially transparent, enabling the user to see through these components to view the real environment, at least when content is not opaquely displayed on the near-eye displays 236A and 236B.

While described predominantly in terms of augmented reality systems with see-through displays, the systems and methods described herein are equally applicable to virtual reality systems and other mixed reality systems that with more opaque display units. Similarly, while described predominantly with reference to head-mounted display units that include a single, centered optical sensor or camera, the systems and methods described are equally applicable head-mounted display units that include offset cameras and/or multiple cameras, including depth cameras in scenarios where processing speed and power limit the amount of depth information can be processed to enable near-real time image reprojection. Further, the described methods may be applied to movable cameras that are not coupled to a head-mounted display, such as those attached to drones, vehicles, aircraft, watercraft, etc. Additionally, one or more additional computing devices, such as cloud computing devices may be communicatively coupled to the head-mounted display system in order to process image data and/or otherwise provide processing bandwidth to execute the described method and processes.

Both read noise and dark current are independent of signal level, and thus may significantly impact the signal-to-noise ratio of captured images at low light levels. As scene brightness increases, the analog gain of the sensor is reduced, resulting in higher read noise and greater full well capacity. As such, it may be desirable to increase an amount of signal received at an imaging device prior to issuing data, in order to increase the signal captured by a factor greater than this inherent noise factor.

Method 300 is a method for operating a head-mounted display system including an imaging device. More specifically, method 300 is targeted to adjusting operating modes of the imaging device responsive to low light conditions and based on movement of the head-mounted display in order to increase signal-to-noise ratio. In some aspects, this is accomplished by selectively adjusting the integration time and/or binning mode of the imaging device based on operating conditions. A binning mode, as applied here may include any suitable means, analog and/or digital, of combining the output of two or more individual pixels into a single superpixel.

At 310, method 300 includes, responsive to an indication that an ambient light condition in an environment is below a lighting threshold, determining an amount of motion of the head-mounted display relative to the environment based on one or more signals received from an inertial measurement unit included in the head-mounted display system. In some examples, the IMU may be continuously or periodically measuring and/or determining motion of the head-mounted display relative to the environment. In such examples, determining an amount of motion may include sampling the output of the IMU responsive and comparing the signal to the indication of an ambient light condition decreasing below a threshold.

In some examples, the ambient light condition may be determined based on a signal received by an optical sensor, such as optical sensor 204 depicted in FIG. 2. Such an optical sensor may be included in an imaging device, such as a 2D and/or 3D camera, and/or may be a standalone digital light sensor. The ambient light sensor may provide and/or generate a signal that correlates with the level of signal received by the imaging device. The criteria for establishing a lighting threshold may be pre-determined, and/or may be based on operating conditions, user preferences, etc.

The signals received from the inertial measurement unit may include acceleration, velocity, rotational velocity, trajectory, and/or other signals that indicate an amount of motion of the head-mounted display, and thus the included imaging device, relative to objects within an environment. In some examples, the amount of motion of the head-mounted display may be determined at least in part based on visual tracking of the HMD using one or more external cameras and a computing device configured to search for movement of identified visual features correlating to the HMD.

At 320, method 300 includes automatically selecting an exposure time, frame rate, and a pixel-binning mode for the imaging device based on the determined amount of motion. As described, one or more thresholds may be set to which the amount of motion may be compared. In some examples, a plurality of thresholds may be implemented over a continuum. In some examples, such thresholds may be user-adjustable. In other words, the user may determine an amount of motion above which the frame rate or binning mode may be adjusted, as some individuals may be more sensitive to motion blur than others. In some examples, the motion thresholds may be determined based on application specific criteria. For example, applications for generating a landscape image may have different thresholds than applications for traversing outdoor terrain at night, which may have different thresholds than for rapidly moving through a building. For example, for night terrain traversal, operating in a binned mode at the lowest possible frame rate may be preferable because the user is likely to be moving slowly, and thus the captured imagery is less susceptible to motion blur. For applications used in a fast paced, time-critical environment, modes and frame rates that reduce integration time and corresponding motion blur and latency may be preferred. In some examples, the selection of an exposure time, frame rate, and/or an operating mode may be iterative, wherein results of a mode selection are assessed and then adjusted based on those assessments.

Optionally, at 321, method 300 may include increasing the integration time and reducing a frame rate of the imaging device responsive to the amount of motion being below a motion threshold. For example, in environments with low IMU movement and low signal, a reduced frame rate may be applied, as motion blur is lessened as a compounding factor as compared to high IMU movement conditions.

Reducing the frame rate, and thus inversely increasing the maximum potential exposure time effectively increases the integration time for the sensor, resulting in additional signal processed per image frame. However, the integration time need not be set at the highest possible duration for a given frame rate. Rather, the integration time may be adjusted based on operating conditions within the parameters set by the frame rate. It should be noted, however, that very short integration times can result in significantly reduced camera sensitivity. This may result in applying increased gain which may introduce additional noise to the signal.

Multiple thresholds (e.g., ambient light thresholds) may be applied having multiple resulting frame rates. The applied sensor frame rates may be integer ratios of the display presentation rate. For example, an HMD having a display operating at 90 Hz may operate the imaging sensor at 90 Hz, 45 Hz (e.g., 1 capture frame to 2 display frames), 30 Hz (1:3), 15 Hz (1:6), etc. Further, the reduced frame rates allow for a longer integration time. For instance, a 90 Hz frame rate allows for a maximum integration time of 11 ms, a 45 Hz frame rate allows for a 22 ms integration time, a 30 Hz frame rate allows for a 33 ms integration time, and a 15 Hz frame rate allows for a 66 ms integration time.

Figure 4:
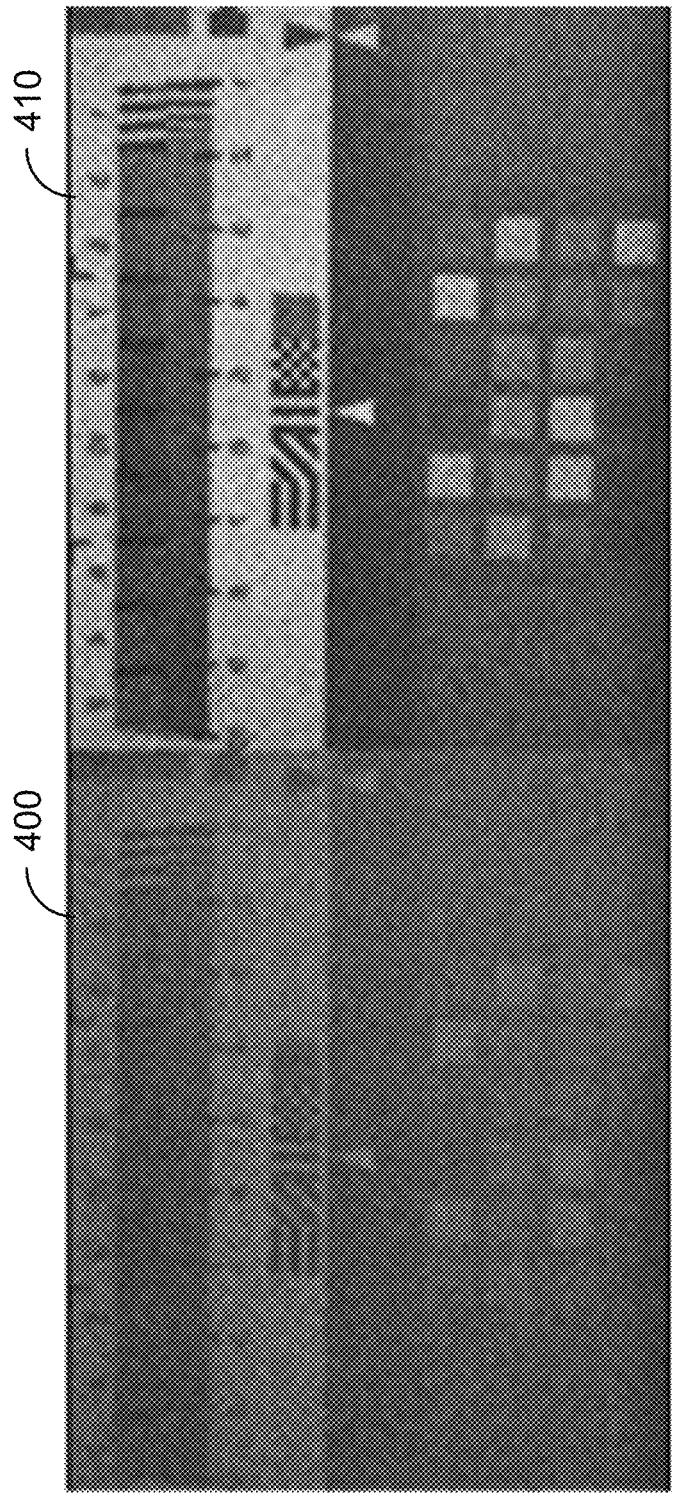
FIG. 4 shows a pair of example image frames.

As an example, FIG. 4 shows a pair of example image frames. Image 400 was acquired at 90 Hz operating speed. Image 410 was acquired at 45 Hz operating speed. Objects in the images were not moving relative to the imaging device during image capture. The improvement in SNR is thus attributable to the increase in integration time stemming from the decrease in frame rate.

Figure 3:
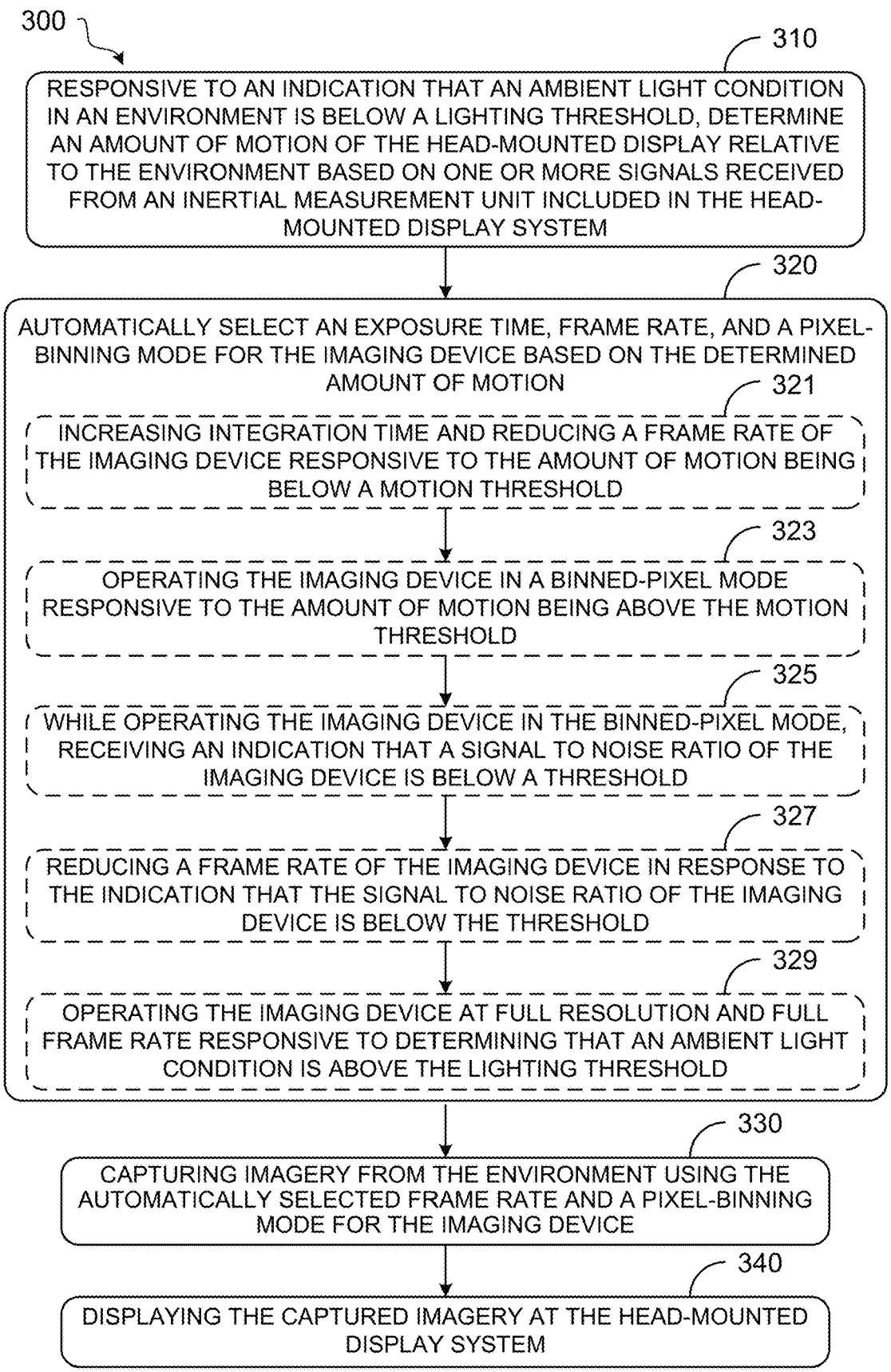
FIG. 3 shows an example method for operating a head-mounted display system including an imaging device.

Returning to FIG. 3, at 323, method 300 optionally includes operating the imaging device in a binned-pixel mode responsive to the amount of motion being above the motion threshold. In each of the described scenarios, the amount and type of filtering may be deliberately applied. For instance, under normal operations, e.g., where a person is walking or maneuvering through a scene), the imaging device could operate in the standard 90 Hz mode without pixel binning. As the light level drops, but the motion remains modest, the capture frequency may be reduced to increase the SNR without fear of motion blue. In scenarios where there is a high amount of motion, but also low signal level, pixel binning may be applied to increase the SNR.

In some examples, the binned-pixel mode may include pixel binning in an analog domain, as only a single event is incurred for multiple pixels. However, in some examples, pixel binning may additionally or alternatively be performed in a digital domain. Analog binning may include combining the electric charge from adjacent CMOS or CCD sensor pixels into one super-pixel, to reduce noise by increasing the signal-to-noise ratio.

Figure 5:
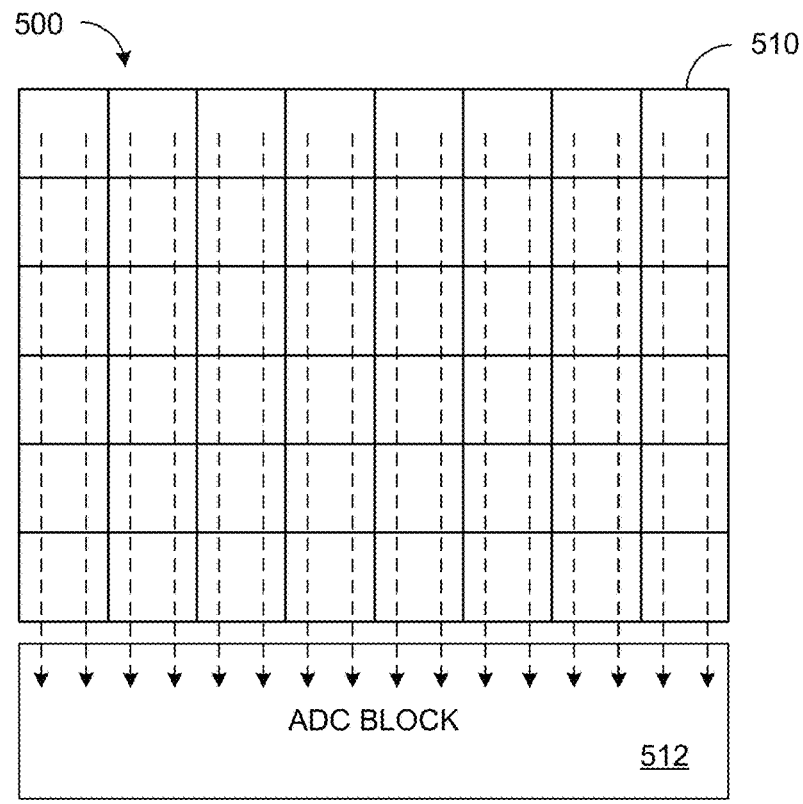
FIG. 5 shows an example pixel array in a full resolution mode and a binned mode.
Figure 5:
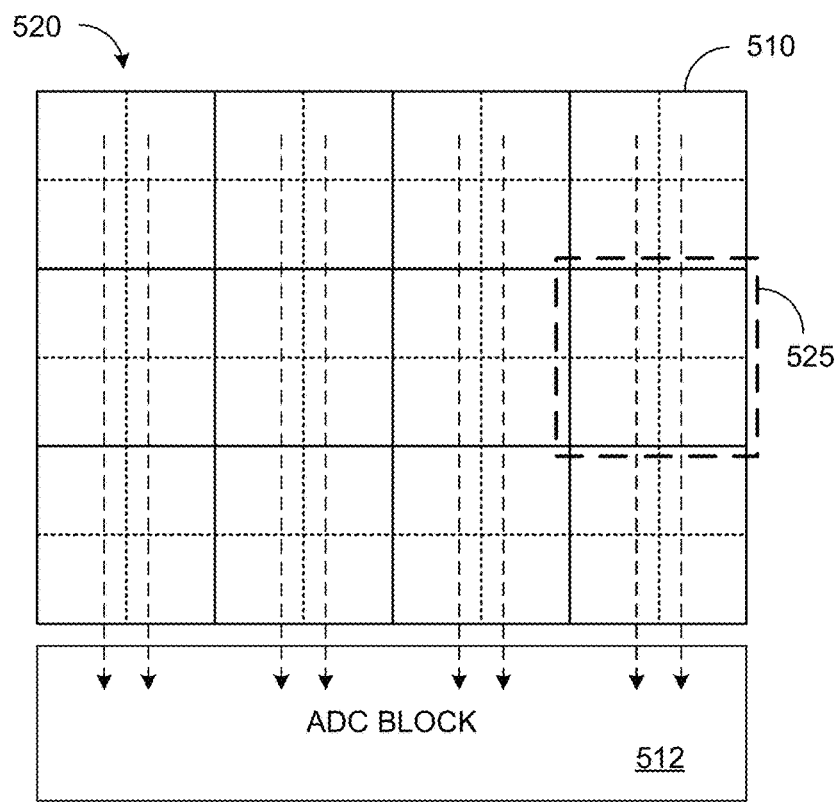

As an example, at 500, FIG. 5 schematically shows a pixel array 510 operating at full resolution (e.g., unbinned mode). Pixel array 510 is depicted as an 8×6 block of 48 pixels, coupled to Analog-to-digital converter (ADC) block 512. In this example, each of the 48 pixels within array 510 are activated and send an individual signal to ADC block 512. At 520, pixel array 510 is shown operating in a binned mode. Pixel array 510 is divided into 4-pixel clusters 525. However, in some example, the clusters could be larger (e.g., 3×3), or smaller, and do not need to be isometric (e.g., 1×3, 2×1). In some examples, multiple levels of binning may be achieved, so that multiple thresholds may evoke binning of increasing number of pixels.

For analog binning, the ADC readout circuitry gathers collective charge from 4 neighboring pixels. As such, the read noise for the 4-pixel cluster is reduced 4-fold. For digital binning, all 4 pixels are read out to ADC 512, then combined and averaged. As such, the read-noise amount is carried from all read-out pixels, and SNR scales as the square root of the number of read-out pixels.

In some examples, operating in a binned mode additionally or alternatively includes applying digital filtering and/or increasing the strength of an applied digital spatial filter. As one example, a bilateral filter or other filter that takes the mean of two or more pixels within a pixel neighborhood may be applied. In some examples, one or more of the strength, size, and weight of the filter kernel may be dynamically controlled based on signals output from the IMU. Such an approach may be used to increase SNR without impacting image resolution.

Returning to FIG. 3, at 325, method 300 optionally includes, while operating the imaging device in the binned-pixel mode, receiving an indication that a signal-to-noise ratio of the imaging device is below a threshold. If the reflectivity and content of the environment is known SNR may be directly measured. If not, the signal-to-noise ratio of the imaging device may be determined based on grey level counts for one or more image frames. A gray level count may be obtained for each pixel of a frame, generating a histogram, or a description of the measured intensity values. A higher range of gray tones correlates with a higher SNR (assuming that we correctly perform dark current subtraction). For example, if the grey level count distribution for a scene is below a threshold, the SNR may be presumed to be above a threshold. In some examples, if there is a very low grey level count in the scene, it can be assumed that the overall signal level is low (e.g., ambient light condition below a threshold). In some examples, average pixel intensity (e.g., signal) and standard deviation (e.g., noise) may be computed for each pixel over time, and an average taken across one or more frames of the pixel array. Some motion filtering may be applied to account for pixels or regions of pixels with expected motion. In some examples, the ambient light condition, amount of motion, and signal-to-noise ratio of the imaging device are determined on a frame-by-frame basis. In some examples, the ambient light condition, amount of motion, and signal-to-noise ratio of the imaging device may be determined based on a rolling average of two or more image frames.

At 327, method 300 includes, reducing a frame rate of the imaging device in response to the indication that the signal-to-noise ratio of the imaging device is below the threshold. In such a scenario, including high IMU movement, low ambient lighting, and low SNR, both pixel binning and an increased integration time (through a reduced frame rate) are applied.

Figure 6:
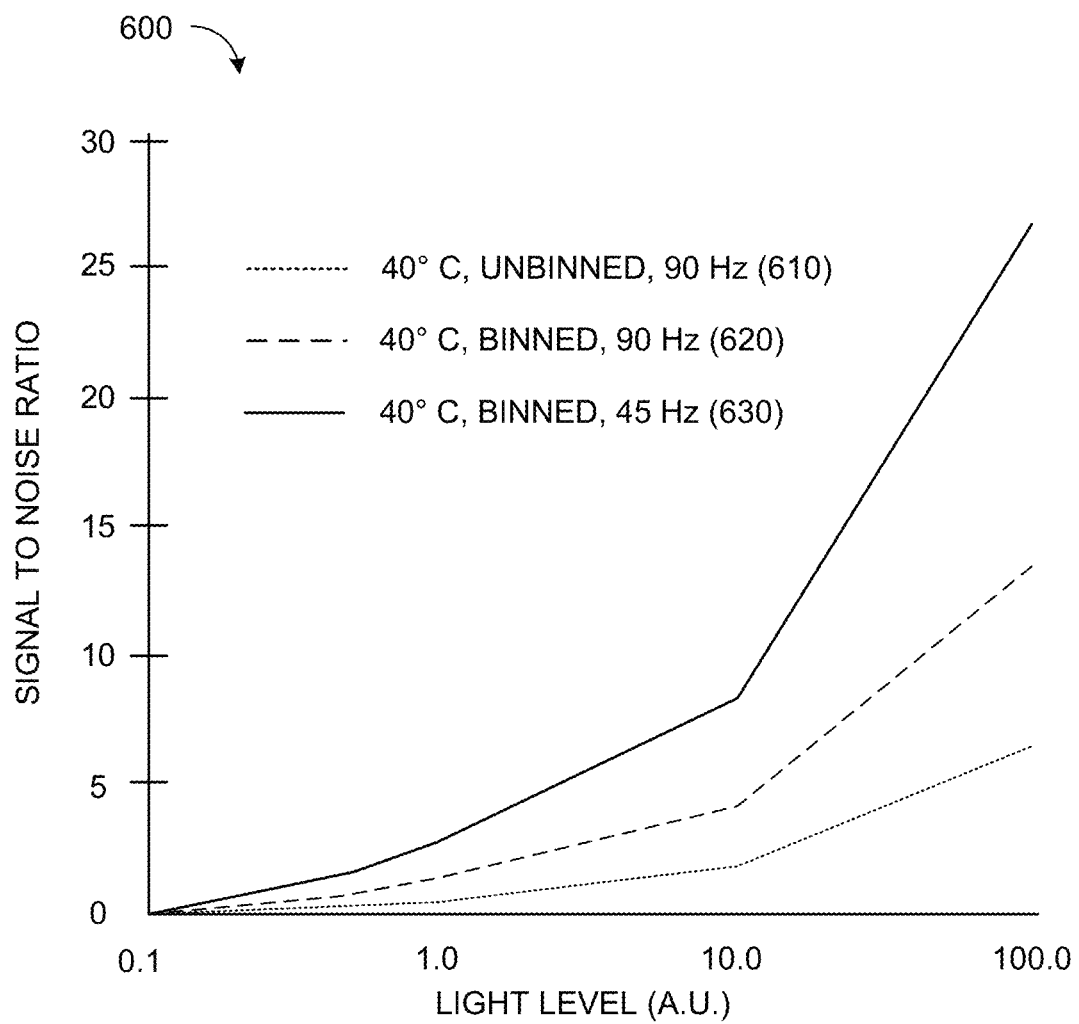
FIG. 6 shows a plot indicating signal-to-noise ratios for various imaging device operating modes.

As an example, FIG. 6. shows a plot 600 indicating signal-to-noise ratios across increasing ambient light levels for various imaging device operating modes. Line 610 (dotted line) represents an imaging device operating in an unbinned mode at a 90 Hz frame rate. Line 620 (dashed line) represents the imaging device operating in an analog binned mode at 90 Hz. An imaging device operating in an unbinned mode at 45 Hz would demonstrate a similar response to line 620. Line 630 (solid line) represents the imaging device operating in an analog binned mode at 45 Hz). Lines 620 and 630 assume that the binned mode is an analog binned mode, accounting for the significant increase in SNR over line 610.

By reducing the frame rate (e.g., increasing the integration time) or operating in binned mode, the SNR of the image may be substantially increased. Although the combination of a lower frame rate (longer integration time) and pixel binning shows a dramatic increase in SNR, it may not be used in all scenarios due to the increase motion blur and latency that is occurred with the longer integration time.

In one example, referring to FIG. 1, if user 102 was attempting to pan environment 100 with the highest possible SNR, but the objects (trees 110, 111, 112) were at a far distance away, binned mode would not be preferred, due to the loss of spatial resolution. However, as the motion of computing system 104 is relatively low, the integration time increased and frame rate may be reduced without causing significant motion blur. For higher motion applications, operating at a full frame rate, either binned or unbinned, may be preferred. For low light navigation applications, a binned mode with a reduced frame rate may be preferred. Such modes may be entered via user and/or application preferences, and/or may be automatically selected as part of the automatic exposure and gain control algorithms of the camera system.

Optionally, at 329, method 300 includes operating the imaging device at full resolution and full frame rate responsive to determining that an ambient light condition is above the lighting threshold. As described at 325, the ambient light condition may be determined on a frame-by-frame basis or based on a rolling average of two or more images.

At 330, method 300 includes capturing imagery from the environment using the automatically selected frame rate and a pixel-binning mode for the imaging device. Continuing at 340, method 300 includes displaying the captured imagery at the head-mounted display system. Prior to displaying the captured imagery, in some examples, one or more Image Signal Processing algorithms, such as motion compensation, spatial filtering, and multi-frame temporal averaging, may be applied based on one or more of the ambient light condition, the amount of motion of the head-mounted display, and the signal-to-noise ration of the captured images.

Implementing the systems and methods described herein allow for adjustment from a high frame rate to a low frame rate and an unbinned operating mode to a binned operating mode without requiring user intervention. Rather operating conditions can be measured, and the operating mode of the imaging device adjusted dynamically based on how the device is being used. This enables an improvement in SNR of images captured by the imaging device while allowing the user to attain an immersive viewing experience appropriate for the conditions at hand.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. Computing system 700 may be considered an embodiment of computing systems 104 and 200.

Computing system 700 includes a logic machine 710 and a storage machine 720 Computing system 700 may optionally include a display subsystem 730, input subsystem 740, communication subsystem 750, and/or other components not shown in FIG. 7.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 750 may be configured to communicatively couple computing system 700 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In one example, a method for operating a head-mounted display system including an imaging device comprises responsive to an indication that an ambient light condition in an environment is below a lighting threshold, determining an amount of motion of the head-mounted display relative to the environment based on one or more signals received from an inertial measurement unit included in the head-mounted display system; automatically selecting an exposure time, frame rate and a pixel-binning mode for the imaging device based on the determined amount of motion; capturing imagery from the environment using the automatically selected exposure time, frame rate and pixel-binning mode for the imaging device; and displaying the captured imagery at the head-mounted display system. In such an example, or any other example, automatically selecting the exposure time, frame rate, and the pixel-binning mode for the imaging device based on the determined amount of motion additionally or alternatively includes: increasing an integration time and reducing a frame rate of the imaging device responsive to the amount of motion being below a motion threshold; and operating the imaging device in a binned-pixel mode responsive to the amount of motion being above the motion threshold. In any of the preceding examples, or any other example, the method additionally or alternatively comprises, while operating the imaging device in the binned-pixel mode, receiving an indication that a signal-to-noise ratio of the imaging device is below a threshold; and reducing a frame rate of the imaging device in response to the indication that the signal-to-noise ratio of the imaging device is below the threshold. In any of the preceding examples, or any other example, the method additionally or alternatively comprises, operating the imaging device at full resolution and full frame rate responsive to determining that an ambient light condition is above the lighting threshold.

In another example, a method for operating a head-mounted display system including an imaging device, comprises determining that an ambient light condition is below a lighting threshold; responsive to determining that the ambient light condition is below the lighting threshold, determining an amount of motion of the head-mounted display system; increasing an integration time and reducing a frame rate of the imaging device responsive to the amount of motion being below a motion threshold; operating the imaging device in a binned-pixel mode responsive to the amount of motion being above the motion threshold; capturing imagery of the environment using a selected frame rate and operating mode; and streaming the captured imagery to the head-mounted display system. In such an example, or any other example, the method additionally or alternatively comprises, while operating the imaging device in the binned-pixel mode, receiving an indication that a signal-to-noise ratio of the imaging device is below a threshold; and reducing a frame rate of the imaging device in response to the indication that the signal-to-noise ratio of the imaging device is below the threshold. In any of the preceding examples, or any other example, the signal-to-noise ratio of the imaging device is additionally or alternatively determined based on grey level counts for one or more image frames. In any of the preceding examples, or any other example, the ambient light condition, amount of motion, and signal-to-noise ratio of the imaging device are additionally or alternatively determined on a frame-by-frame basis. In any of the preceding examples, or any other example, the ambient light condition, amount of motion, and signal-to-noise ratio of the imaging device are additionally or alternatively determined based on a rolling average of two or more image frames. In any of the preceding examples, or any other example, the binned-pixel mode additionally or alternatively includes pixel binning in an analog domain. In any of the preceding examples, or any other example, the method additionally or alternatively comprises operating the imaging device at full resolution and full frame rate responsive to determining that an ambient light condition is above the lighting threshold. In any of the preceding examples, or any other example, the amount of motion is additionally or alternatively determined based on one or more signals received from an IMU included in the head-mounted display system. In any of the preceding examples, or any other example, a strength of applied spatial filtering is additionally or alternatively adjusted based on the one or more signals received from the IMU.

In yet another example, a head-mounted display system, comprises an imaging device; a near-eye display; and a controller configured to: determine that an ambient light condition is below a lighting threshold; responsive to determining that the ambient light condition is below the lighting threshold, determine an amount of motion of the head-mounted display system; increase an integration time and reduce a frame rate of the imaging device responsive to the amount of motion being below a motion threshold; operate the imaging device in a binned-pixel mode responsive to the amount of motion being above the motion threshold; capture imagery of the environment using a selected frame rate and operating mode; and stream the captured imagery to the near-eye display. In such an example, or any other example, the controller is additionally or alternatively configured to, while operating the imaging device in the binned-pixel mode, receive an indication that a signal-to-noise ratio of the imaging device is below a threshold; and reduce a frame rate of the imaging device in response to the indication that the signal-to-noise ratio of the imaging device is below the threshold. In any of the preceding examples, or any other example, the signal-to-noise ratio of the imaging device is additionally or alternatively determined based on grey level counts for one or more image frames. In any of the preceding examples, or any other example, the ambient light condition, amount of motion, and signal-to-noise ratio of the imaging device are additionally or alternatively determined on a frame-by-frame basis. In any of the preceding examples, or any other example, the binned-pixel mode additionally or alternatively includes pixel binning in an analog domain. In any of the preceding examples, or any other example the controller is additionally or alternatively configured to: operate the imaging device at full resolution and full frame rate responsive to determining that an ambient light condition is above the lighting threshold. In any of the preceding examples, or any other example, the head-mounted display system additionally or alternatively comprises an inertial measurement unit, and the controller is additionally or alternatively configured to: determine the amount of motion based on one or more signals received from the inertial measurement unit.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for operating a head-mounted display system including an imaging device, comprising:
    responsive to an indication that an ambient light condition in an environment is below a lighting threshold, determining an amount of motion of the head-mounted display relative to the environment based on one or more signals received from an inertial measurement unit included in the head-mounted display system;
    automatically selecting an exposure time, frame rate and a pixel-binning mode for the imaging device based on the determined amount of motion, wherein the determined amount of motion being below a motion threshold results in one or more of the exposure time being increased and the frame rate being decreased, and wherein an amount of motion being above the motion threshold results in the imaging device being operated in a binned-pixel mode;
    capturing imagery from the environment using the automatically selected exposure time, frame rate and pixel-binning mode for the imaging device;
    displaying the captured imagery at the head-mounted display system;
    while operating the imaging device in the binned-pixel mode, receiving an indication that a signal-to-noise ratio of the imaging device is below a threshold; and
    reducing a frame rate of the imaging device in response to the indication that the signal-to-noise ratio of the imaging device is below the threshold.

2. The method of claim 1, further comprising:
    operating the imaging device at full resolution and full frame rate responsive to determining that an ambient light condition is above the lighting threshold.

3. A method for operating a head-mounted display system including an imaging device, comprising:
    determining that an ambient light condition is below a lighting threshold;
    responsive to determining that the ambient light condition is below the lighting threshold, determining an amount of motion of the head-mounted display system;
    increasing an integration time and reducing a frame rate of the imaging device responsive to the amount of motion being below a motion threshold;
    operating the imaging device in a binned-pixel mode responsive to the amount of motion being above the motion threshold;
    capturing imagery of the environment using a selected frame rate and operating mode;
    streaming the captured imagery to the head-mounted display system; and
    while operating the imaging device in the binned-pixel mode, receiving an indication that a signal-to-noise ratio of the imaging device is below a threshold; and
    reducing a frame rate of the imaging device in response to the indication that the signal-to-noise ratio of the imaging device is below the threshold.

4. The method of claim 3, wherein the signal-to-noise ratio of the imaging device is determined based on grey level counts for one or more image frames.

5. The method of claim 3, wherein the ambient light condition, amount of motion, and signal-to-noise ratio of the imaging device are determined on a frame-by-frame basis.

6. The method of claim 3, wherein the ambient light condition, amount of motion, and signal-to-noise ratio of the imaging device are determined based on a rolling average of two or more image frames.

7. The method of claim 3, wherein the binned-pixel mode includes pixel binning in an analog domain.

8. The method of claim 3, further comprising:
    operating the imaging device at full resolution and full frame rate responsive to determining that an ambient light condition is above the lighting threshold.

9. The method of claim 3, wherein the amount of motion is determined based on one or more signals received from an IMU included in the head-mounted display system.

10. The method of claim 9, wherein a strength of applied spatial filtering is adjusted based on the one or more signals received from the IMU.

11. A head-mounted display system, comprising:
an imaging device;
a near-eye display; and
a controller configured to:
  determine that an ambient light condition is below a lighting threshold;
  responsive to determining that the ambient light condition is below the lighting threshold, determine an amount of motion of the head-mounted display system;
  increase an integration time and reduce a frame rate of the imaging device responsive to the amount of motion being below a motion threshold;
  operate the imaging device in a binned-pixel mode responsive to the amount of motion being above the motion threshold;
  capture imagery of the environment using a selected frame rate and operating mode;
  stream the captured imagery to the near-eye display;
  while operating the imaging device in the binned-pixel mode, receive an indication that a signal-to-noise ratio of the imaging device is below a threshold; and
  reduce a frame rate of the imaging device in response to the indication that the signal-to-noise ratio of the imaging device is below the threshold.

12. The head-mounted display system of claim 11, wherein the signal-to-noise ratio of the imaging device is determined based on grey level counts for one or more image frames.

13. The head-mounted display system of claim 11, wherein the ambient light condition, amount of motion, and signal-to-noise ratio of the imaging device are determined on a frame-by-frame basis.

14. The head-mounted display system of claim 11, wherein the binned-pixel mode includes pixel binning in an analog domain.

15. The head-mounted display system of claim 11, wherein the controller is further configured to:
operate the imaging device at full resolution and full frame rate responsive to determining that an ambient light condition is above the lighting threshold.

16. The head-mounted display system of claim 11, further comprising an inertial measurement unit, and wherein the controller is further configured to:
determine the amount of motion based on one or more signals received from the inertial measurement unit.

* * * * *